2,620,892

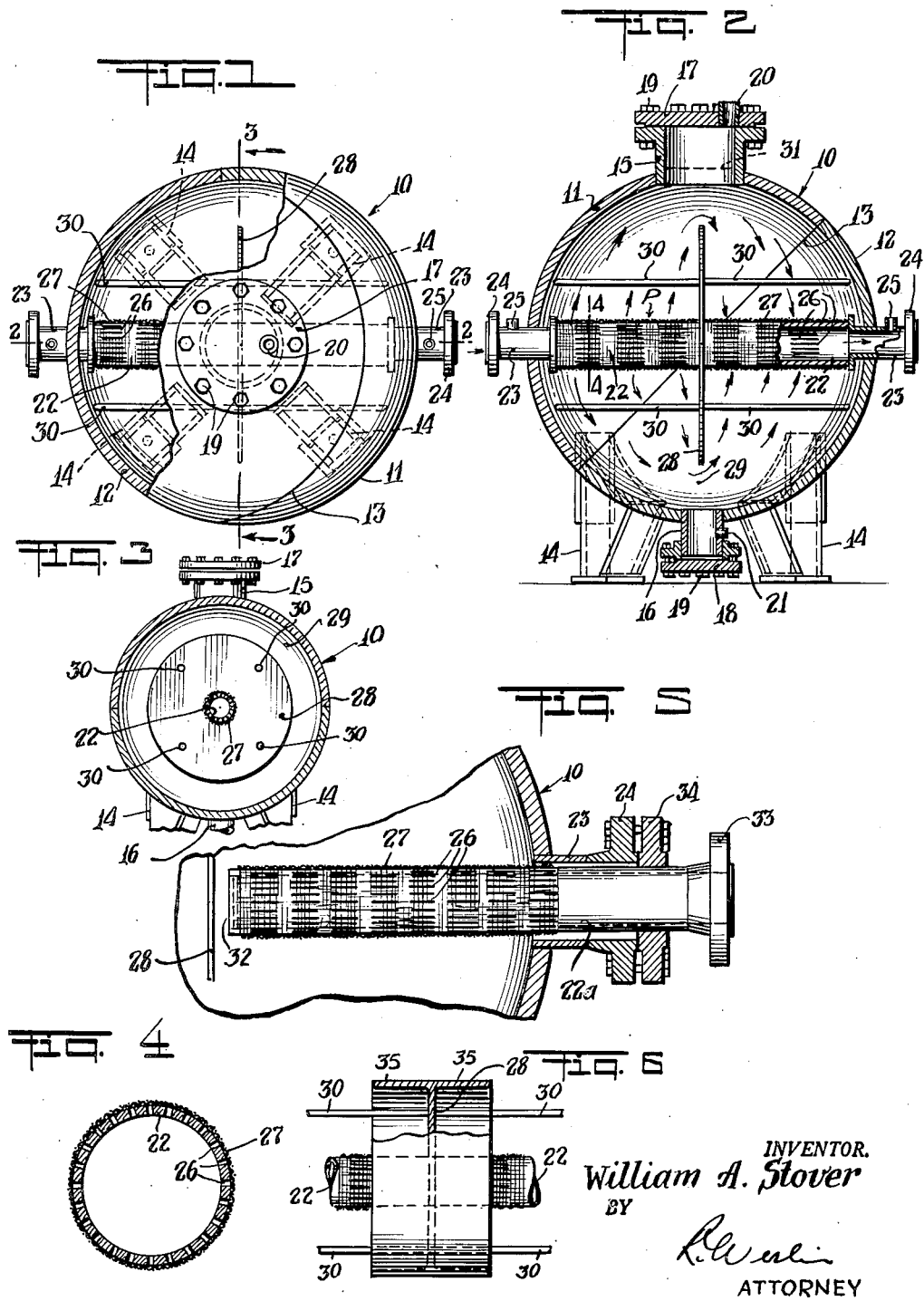
Dec. 9, 1952 — W. A. STOVER — 2,620,892
SPHERICAL DEHYDRATOR
Filed May 5, 1950
INVENTOR.
William A. Stover
ATTORNEY Patented Dec. 9, 1952

UNITED STATES PATENT OFFICE 2,620,892

SPHERICAL DEHYDRATOR

William Arthur Stover, Houston, Tex.

Application May 5, 1950, Serial No. 160,160

1 Claim. (Cl. 183—4)

This invention relates to dehydrators and particularly to dehydrators of the type in which gaseous fluids are contacted with solid desiccants for the removal of moisture therefrom.

Such dehydrators are employed in various industrial installations particularly natural gas and gasoline plants, oil refineries, chemical plants, and the like, for removing moisture or other liquid constituents carried by the gas, often under relatively high pressures.

Conventional dehydrators are ordinarily made in a hollow cylindrical shape which are generally vertically positioned and adapted to contain a bed of desiccant material arranged so that the gases to be dried flow generally longitudinally of the vessel. Various baffling means are employed to obtain effective contact with the desiccant but all such arrangements are subject to varying pressure drops and degrees of channeling of the gaseous fluid with resulting loss of over-all efficiency. Moreover, most solid desiccants are used in granular form and are composed of materials which are relatively friable, with the result that after continued periods of use, fine particles of the desiccant will be formed which tend to pack in and about the various passages through the vessel, thereby undesirably increasing the pressure drop through the vessel and requiring frequent clean-outs. Also dehydrators of the more conventional cylindrical shape must employ shells of relatively heavy construction in order to withstand high pressures and temperatures at which processing of the gases is often conducted.

A primary object of the present invention is to provide a dehydrator of improved shape and construction which obviates the aforementioned undesirable features of more conventional dehydrators.

A principal object is to provide a dehydrator having a shell of generally spherical shape.

Another object is to provide a dehydrator having a shell of generally spherical shape in which co-axial inlet and discharge connections for the gaseous fluids are arranged on one axis of the shell, and are separated by a transverse generally circular baffle of smaller diameter than the shell to provide an annular passageway of generally uniform area between the inlet and discharge sections of the shell.

Other and more specific objects and advantages of this invention will become readily apparent from the following detailed description when read in conjunction with the accompanying drawings which illustrate useful embodiments in accordance with this invention.

In the drawings:

Fig. 1 is a top view of a dehydrator in accordance with one embodiment of this invention;

Fig. 2 is a cross-sectional view taken along line 2—2 of Fig. 1;

Fig. 3 is a cross-sectional view on a reduced scale taken generally along line 3—3 of Fig. 1;

Fig. 4 is an enlarged cross-sectional view of the gas inlet-discharge element of the dehydrator taken along line 4—4 of Fig. 2;

Fig. 5 is a fragmentary view, in section, showing another arrangement of the inlet-discharge elements in the shell; and Fig. 6 is a fragmentary view, partly in section, showing another embodiment of the central baffle plate.

Referring to the drawings, the dehydrator comprises a hollow generally spherical shell, designated generally by the numeral 10, which may conveniently be formed of two hemispherical segments 11—11, which are adapted to be joined together along their edges, as indicated by the seam 13, by welding or by any other suitable and conventional means. For convenience in description, segment 11 will be referred to as the upper segment and segment 12 as the lower segment. Shell 10 is mounted on any suitable or conventional pedestal or cradle, such as may be formed by a plurality of angularly spaced generally upright leg members 14—14, as shown, whereby the shell may be elevated somewhat above a base or foundation on which the legs are set.

Upper and lower segments 11 and 12 are provided with flanged manheads 15 and 16, respectively, communicating with the interior of the shell and provided with cover plates 17 and 18, respectively, removably connected to the respective manheads by any suitable means such as bolts 19. A nipple 20 may be installed in cover 17 for connection of a pressure relief valve, pressure gauge, or other more or less conventional fitting, and a nipple 21 may be installed in lower manhead 16 for connection of a drain line or the like. Manheads 15 and 16 are positioned in their respective shell segments, so that when the latter are joined and the shell is mounted in the position illustrated in the drawing, the manheads will be co-axially aligned and on the vertical axis of the shell.

A combined inlet-discharge pipe P, composed of co-axial sections 22—22, extends through the interior of shell 10 along its horizontal axis, the outer ends of the sections being connected to tubular nozzles 23—23, one of which serves as the inlet and the other as the discharge connection for gaseous fluid to be conducted through the dehydrator. Nozzles 23 are fitted with conventional bolt flanges 24—24 for connection of supply and discharge pipes for the gaseous fluid and have inserted therein, at points externally of shell 10, nipples 25—25 which may be employed as thermometer wells, pressure gauge connections, and the like. Sections 22 are each provided with a plurality of radially arranged openings, such as slots 26, which provide communication between the interiors of sections 22 and shell 10. A screen 27 of any suitable mesh size is arranged about the exteriors of sections 22 to cover slots 26. Screen 27 may be a conventional type of flexible metallic screen cloth.

An imperforate generally circular baffle plate 28 is mounted in the shell transversely of pipe P and in the plane of the vertical axis of the shell which extends through manheads 15 and 16. Baffle plate 28 extends between the inner ends of sections 22 which may be welded to the opposite sides of the plate, whereby the latter serves to segregate sections 22 of the pipe from each other. The diameter of baffle plate 28 is made somewhat less than that of the interior of the shell to provide an annular passageway 29 between the outer edge of the baffle plate and the interior wall of the shell to permit flow of gases from one side of the shell to the other. A plurality of bracing rods 30 extend between the opposite sides of baffle plate 28 and the inner wall of shell 10 to support the baffle in its vertical position in the shell, as shown.

In operation shell 10 will be filled with any suitable and generally conventional solid desiccant, which is adapted to extract moisture or other liquid which it is desired to remove from the gaseous fluid passing through the shell. The desiccant is not shown in the drawings in order to permit greater clarity in illustration of the dehydrator structure. The desiccant will ordinarily be in granular form and will be introduced through manhead 15. Normally the shell will be completely filled with the desiccant so as to leave no free space therein for passage of gaseous fluid out of contact with the desiccant. The body of the desiccant will, therefore, ordinarily extend into the interior of manhead 15, as indicated by the broken line 31 in Fig. 2.

The gaseous fluid to be subjected to the dehydrating action of the desiccant will be introduced into the shell through one of the nozzles 23 and discharged therefrom through the other. The path of flow of the gaseous fluid is indicated generally by the arrows in Fig. 2 but may flow in the reverse direction, if desired. The entering gases will flow through the interior of the section 22 on one side of baffle plate 28 and will emerge therefrom through slots 26, passing through screen 27 into the body of the desiccant. The arrangement of slots 26 will be such as to provide for maximum uniformity of distribution of the gases in the surrounding body of desiccant. To this end the spacing of slots 26 may be closer at points along the pipe sections more distant from baffle plate 28 than at points nearer to the baffle plate. It will be understood that any suitable arrangement and shape of slots 26 may be employed in accordance with well-known principles, to assure uniformity of distribution of the gases in the desiccant body. Screen 27 will prevent the desiccant particles from falling through slots 26 into the interior of sections 22 and there prevent plugging of the slots and pipe by the desiccant.

The gases emerging from the inlet section 22 will flow through the body of desiccant on the inlet side of the baffle plate and thence through annular space 29 and into and through the portion of the body of the desiccant on the outlet side of the baffle plate, whence the gases enter the outlet section 22 through screen 27 and slots 26 and are discharged from the shell through the outlet nozzle 23. The contact of the gases with the desiccant in passage through the shell will, of course, produce the desired dehydration of the gases. After it has become spent the desiccant may be removed from the shell through lower manhead 16 by removing cover plate 18.

By employment of the spherical shape for shell 10, and the provision of the central circular baffle plate 28, annular passageway 29 will be of substantially uniform area, thereby assuring uniform distribution of the gases in their contact with the body of desiccant and will avoid or obviate the danger of channeling of gases in the body of desiccant and provide a relative large passage area for the gases, thereby resulting in a minimum degree of pressure drop through the dehydrator. The spherical shape of the shell also provides maximum strength with minimum shell thickness, thereby reducing the construction costs. Also the provision of the open annular area 29 will allow for substantial accumulation of desiccant fines in the lower portion of the vessel without seriously interfering with the flow of gases or introducing any material pressure drop as a result thereof.

Fig. 5 illustrates a modification of the previously described dehydrator, which is particularly adapted for use in dehydrators of small sizes. In this modification pipe P of the previous embodiment is divided into two sections 22a (only one shown), each of which is provided with slots 26 and screen 27 and is of a length to extend to approximately the center of the shell, adjacent the baffle plate 28 which will extend between the inner ends of the sections. The inner end of each of the sections is closed by means of a plate 32. Sections 22a are made somewhat smaller in external diameter than the bore of nozzles 23 so that the sections may be slidably inserted into the shell through the respective nozzles 23. The outer end of each section is equipped with a flange 33 for connection of gas supply and discharge conduits, and a second flange 34 is mounted on each section 22a slightly inwardly of flange 33 and is adapted to be bolted to flange 24 in order to hold the section in place and to form a seal between the section and the nozzle through which it is inserted. The flow of gaseous fluid in this case is identical with that in the previously described embodiment.

Fig. 6 illustrates another embodiment of central baffle plate 28, in which the latter is provided with peripheral flanges 35—35 extending for a short distance laterally from the opposite sides of the baffle plate. This arrangement forces the gases flowing in the vicinity of the baffle plate to travel a somewhat more tortuous path in passing through the body of desiccant material, thereby further reducing the danger of channeling along the faces of the baffle plate.

The term "spherical" as employed herein is intended to include shapes which are not necessarily true spheres, such, for example, as spheroids, or even oblate spheroids, although the more nearly spherical shape is to be preferred because of its greater strength.

It will be understood that various changes and alterations may be made in the details of this invention without departing from the scope of the appended claim but within the spirit of this invention.

What I claim and desire to secure by Letters Patent is:

A dehydrator for gaseous fluids, comprising, a generally spherical hollow shell, a pipe extending entirely through said shell along its horizontal axis, an imperforate generally circular baffle plate of somewhat smaller diameter than said shell disposed therein along its vertical axis and intersecting said pipe, the outer periphery of said baffle plate being concentrically spaced from the wall of said shell, said baffle plate having peripheral flanges extending laterally from opposite sides thereof, a plurality of radial openings in said pipe interiorly of said shell and on opposite sides of said baffle plate, and manheads communicating with the upper and lower portions of said shell.

WILLIAM A. STOVER.

REFERENCES CITED

The following references are of record in the file of this patent:

UNITED STATES PATENTS

| Number | Name | Date |
|---|---|---|
| 1,572,245 | Quinn | Feb. 9, 1926 |
| 1,775,362 | Demarcus | Sept. 9, 1930 |
| 1,833,919 | Sisson | Dec. 1, 1931 |
| 1,839,350 | Slagel | Jan. 5, 1932 |
| 2,157,829 | Metzgar | May 9, 1939 |
| 2,231,076 | Lake et al. | Feb. 11, 1941 |
| 2,283,989 | Henry | May 26, 1942 |
| 2,383,065 | Lehman | Aug. 21, 1945 |
| 2,489,903 | Kraft | Nov. 29, 1949 |